United States Patent [19]

Bauch et al.

[11] Patent Number: 4,859,222

[45] Date of Patent: Aug. 22, 1989

[54] METHOD FOR THE MANUFACTURE OF A LIGHT WAVE GUIDE

[75] Inventors: Hartmut Bauch, Liederbach; Peter Krause; Ulrike Jost, both of Mainz; Ralf Kersten, Bremthal; Volker Paquet, Mainz; Wolfgang Siefert, Freiburg, all of Fed. Rep. of Germany

[73] Assignee: Schott Glaswerke, Mainz, Fed. Rep. of Germany

[21] Appl. No.: 255,106

[22] Filed: Oct. 7, 1988

[30] Foreign Application Priority Data

Oct. 7, 1987 [DE] Fed. Rep. of Germany ....... 3733880

[51] Int. Cl.$^4$ ........................................... C03B 37/023
[52] U.S. Cl. ..................... 65/3.12; 65/3.11; 65/3.15; 65/3.2
[58] Field of Search ................. 65/3.12, 3.2, 3.11, 65/3.15

[56] References Cited

U.S. PATENT DOCUMENTS

| | | | |
|---|---|---|---|
| 3,938,874 | 2/1976 | Macedo et al. | 65/3.15 |
| 4,110,093 | 8/1978 | Macedo et al. | 65/3.15 |
| 4,525,189 | 6/1985 | Ohmi et al. | 65/3.15 |
| 4,636,235 | 1/1987 | Glessner et al. | 65/3.12 |
| 4,636,236 | 1/1987 | Gessner et al. | 65/3.12 |
| 4,715,875 | 12/1987 | Jacobson | 65/3.12 |

FOREIGN PATENT DOCUMENTS 1555562 11/1979 United Kingdom ................. 65/3.12

*Primary Examiner*—Arthur D. Kellogg
*Attorney, Agent, or Firm*—Barnes & Thornburg

[57] ABSTRACT

A method for the manufacture of a light wave guide providing a cladding and a light conducting core, from a glass tube, showing a material on or below its inner surface which forms the core of the finished light wave guide comprising at least one substance which is diffused out selectively of this material, forming the core subsequently, into the interior space of the glass tube, whereby during the diffusing-out process the partial pressure of the diffusing-out substance in the interior space of the glass tube is maintained as small as possible, whereby a premature collapsing of the glass tube during the diffusion process is prevented by adjusting an overpressure in the glass tube, that the glass tube after the diffusing out process is largely collapsed by rinsing with a rinsing gas and in a last collapsing step is completely collapsed to a rod (perform) without rinsing with a rinsing gas and that the rod is subsequently drawn out to a fiber.

8 Claims, 2 Drawing Sheets

METHOD FOR THE MANUFACTURE OF A LIGHT WAVE GUIDE

BACKGROUND OF THE INVENTION

The invention relates to a method for manufacturing a light wave guide comprising a cladding and a light-conducting core, from a glass tube which on or below its interior surface comprises a material forming the core of the finished light wave guide, the material containing at least one substance which is selectively diffused out at a suitable temperature from the material which later forms the core into the interior space of the glass tube.

One of the most important processes for the manufacture of light guiding fibers is the interior coating of a tube (MCVD, PCVD, PICVD). Thereby thin layers of doped quartz glass are precipitated on the inner side of a quartz glass tube. The desired radial course of the refractive index is thereby adjusted by the choice and the concentration of the doping agent, the core thereby showing a higher refractive index than the cladding.

After the coating the tube is collapsed in several steps at an elevated temperature to form a rod, which can be drawn out to form a light-conducting fiber. It is yet possible to draw a light-conducting fiber directly from the coated tube without collapsing the tube to a rod.

From DE-OS No. 29 12 960 a method for the manufacture of light-conducting fibers is known whereby a tube is used, being formed of glass at least in its inner part, comprising at least one component to decrease the refractive index, whereby the tube is heated in such a way that a part of this component diffuses out through the inner side of the tube while the tube is drawn out to form a light-conducting fiber.

The diffusing-out of the component decreasing the refractive index and the heating up to the drawing-temperature thereby substantially takes place in a single step; the drawing-out of the tube to form a light-conducting fiber can take place in a second step as well.

This method shows the disadvantage that a constant course of the refractive index profile along the whole length of the so manufactured fiber cannot be obtained. Since the tube is sealed at one end at the beginning of the diffusing-out process, a counter-pressure arises in the interior space of the glass tube by the diffusing-out doping agent, so rendering difficult a further diffusing-out process. If this pressure reaches the equilibrium pressure no further diffusing-out takes place. An influence on the refractive index profile is expensive and only possible on the heat input and the drawing speed, respectively. This also applies if, in a first step, solely the diffusing-out and, in a second step, the drawing-out of the tube takes place.

This method therefore cannot be applied to a manufacture of light-conducting fibers having optical characteristics being independent from the length.

SUMMARY OF THE INVENTION

It is an object of the invention to create a method by means of which a "dip"-free light wave guide, showing a constant refractive index profile along its whole length, can be produced in a simple way and on favourable costs.

This object is achieved according to the features mentioned in the characterizing part of the claim 1.

The invention is based on that during the diffusion process the partial pressure of the substance diffusing out is held as small as possible within the interior space of the glass tube by rinsing the tube with a gas, so that the doping agent can evaporate unhindered from the inner surface of the glass tube because the equlibrium pressure of the reaction "(glass+doping agent) = (glass)+(doping agent)" can never turn up. In addition, a premature total collapsing of the glass tube is prevented by maintainance of a gas overpressure in the interior space of the glass tube. This prevention of a premature collapsing is of importance for that reason, that the diffusion takes place the quicker and more complete, the thinner the layer out of which the diffusion occurs. It is therefore advantageous to perform and to terminate the diffusion process at inside diameters of the glass tube being as great as possible.

In this way a glass tube is obtained showing a constant refractive index profile along its whole length in an area below the inner surface of the glass tube, this area subsequently forming the core.

Only then the glass tube is collapsed to a rod (preform). During the single collapsing steps rinsing with a gas also take place; merely the last collapsing step, forming a rod from a tube of very small inner diameter, takes place without rinsing. This rinsing, however, is no more so important because the diffusion process has already been terminated before. Subsequently, the rod is drawn out to a fiber.

According to an embodiment a glass tube is used already comprising this diffusing-out substance in its composition in a surface layer. Herewith this glass tube can show a F-containing composition. In view of this embodiment it is of extraordinary advantage, that the expensive coating, according to one of the known methods (MCVD, PCVD, PICVD) demanding a high sacrifice of time, is dropped completely.

According to a further embodiment the inner surface of a glass tube is furnished with a coating comprising this diffusing-out substance. According to a special embodiment the coating material, which can be applied according to the PICVD-method is doped with fluorine.

For the manufacturing of monomode fibers one or several intermediate layers, being doped in an equal or different concentration by refractive index-changing substances, this substances not diffusing out, are applied before the application of the layer containing the diffusing-out substance.

According to a further embodiment this material forming the core of the finished light wave guide is produced in an inner surface, this inner surface being treated in such a way that a compound being present in this layer is changed into a substance diffusing out into the interior space of the glass tube out of this layer at the collapsing or fiber-drawing temperature. According to the substance to be changed this changing is arranged by an oxidizing or reducing substance, respectively, this substance having been allowed to diffuse into the inner surface layer before the diffusing-out process.

The method according to the invention is not confined to quartz glass tubes. Fluoride glass tubes or chalogenide glass tubes e.g. can also be used. In this case, however, other diffusing-out substances than the aforementioned, thereby changing the refractive index, have to be used.

An embodiment of the invention is hereinafter illustrated in more detail with the respect to the drawings.

DETAILED DESCRIPTION OF THE DRAWINGS

A quartz glass tube is coated on its inner surface according to the PICVD-method as it is described in DE-OS No. 30 10 314. The mass flows of the gaseous compounds $O_2$, $SiCl_4$, $CCl_2F_2$ are 200, 50, 1.5 ml/min. The coating temperature ranges between 1050° C. and 1150° C.

Figure 1:
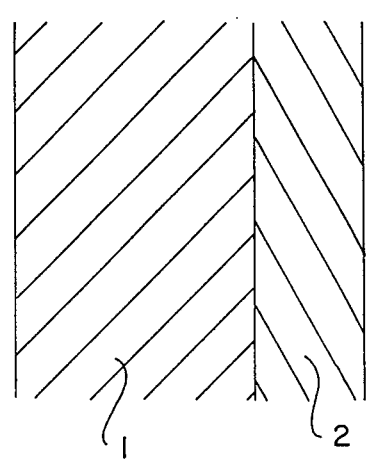
FIG. 1 shows a refractive index profile of a quartz glass tube coated according to the PICVD-method with its coating being doped by fluorine.
Figure 1:
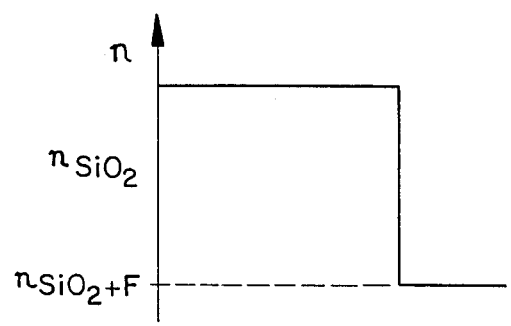

After the coating the refractive index profile shown in FIG. 1 results. $n_{Si2}$ indicates the refractive index of the glass tube wall 1 and $n_{SiO_2+F}$ indicates the refractive index of the coating 2.

Subsequently the coated tube area is heated up to about 2200° C., respectively, in two travels by means of a $H_2/O_2$-burner thereby the flourine being selectively brought to diffuse out. The tube thereby is passed through by oxygen (200 ml/min). An overpressure of 0.7 mbar is maintained in the tube by means of a throttle operating as a pressure stage, at the gas outlet end of the tube.

In a third and fourth travel the tube is collapsed at an overpressure of 0.3 mbar increasing the temperature only insignificantly; fluorine thereby still diffusing out of the inner tube surface, though at a much smaller degree as in the first two steps. The rinsing by oxygen is maintained in steps three and four. After the fourth travel of the burner the central channel still shows a diameter of about 1 mm. The central channel is closed by the fifth travel of the burner.

Figure 2:
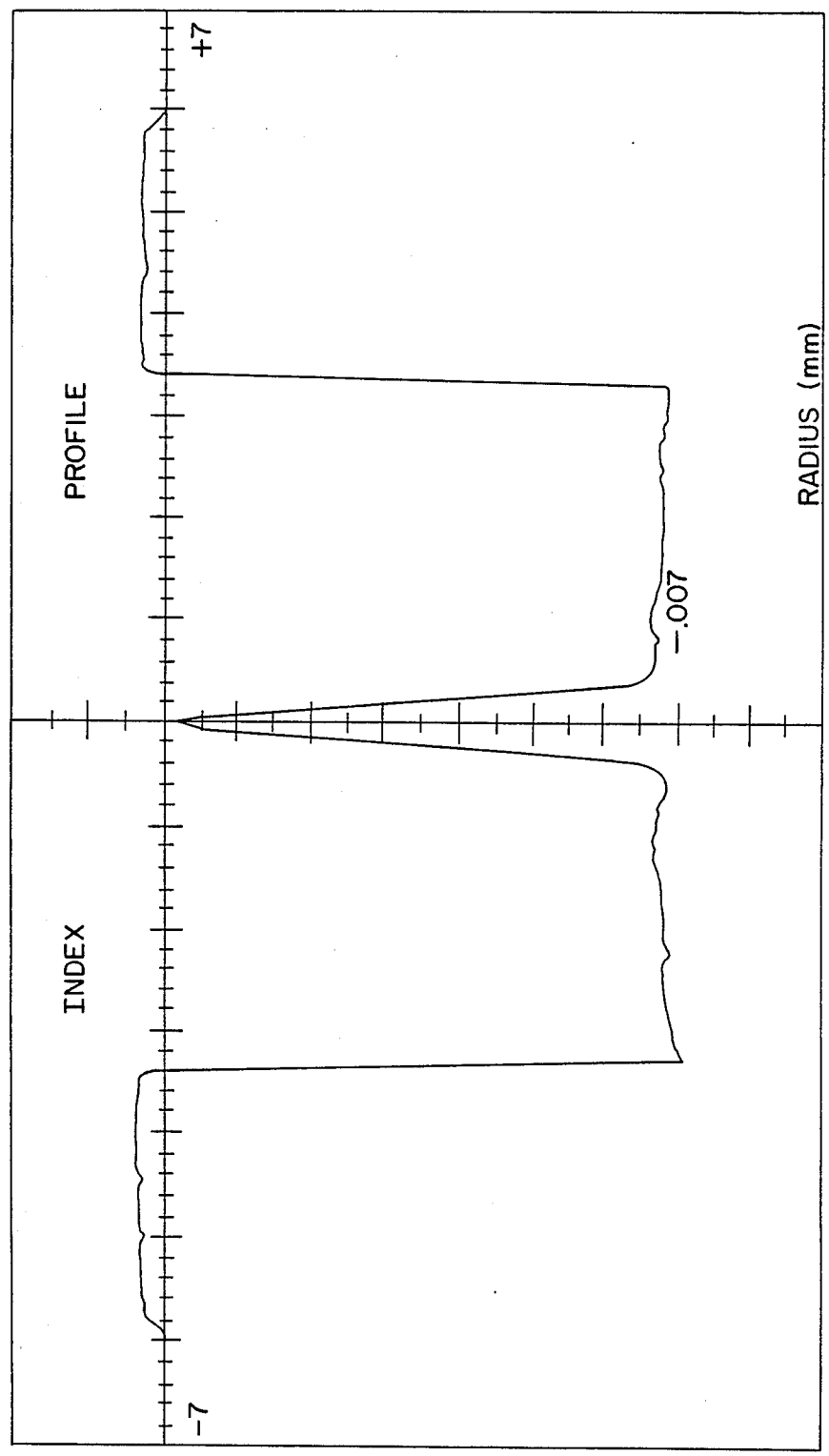
FIG. 2 shows a refractive index profile of the preform manufactured by the process according to the invention.

FIG. 2 shows a radial course of the refractive index of the preform, being very uniform along a length of 30 cm, showing about 80% of the material precitipated altogether. The profile of the core nearly shows a Gaussian-distribution. Subsequently this preform is drawn out to a monomode fiber according to the conventional method, this fiber showing small losses and being extremely insensitive to bending.

What is claimed is:

1. Method for the manufacture of a light wave guide, providing a cladding and a light-conducting core, from a glass tube showing a material on or below its inner surface which forms the core of the finished light wave guide, comprising at least one substance which is selectively diffused out of this material forming the core subsequently, into the interior space of the glass tube at a suitable temperature, characterized in that during the diffusing-out process the partial pressure of the diffusing-out substance in the interior space of the glass tube is maintained as small as possible whereby a premature collapsing of the glass tube during the diffusion process is prevented by adjusting an overpressure in the glass tube, the glass tube, after the diffusing-out process, is largely collapsed while rinsing with a rinsing gas and in a last collapsing step is completely collapsed to a rod (preform) without rinsing with a rinsing gas and that the rod is subsequently drawn out to a fiber.

2. Method according to claim 1, characterized in that the material forming the core of the finished light wave guide is produced in an inner surface layer of a glass tube, already containing in its composition the substance diffusing out into the interior space of the glass tube.

3. Method according to claim 1, characterized in that the inner surface of the glass tube is coated with a material containing the substance diffusing out into the interior space of the glass tube.

4. Method according to claim 2, characterized in that the glass tube shows a fluorine containing composition.

5. Method according to claim 3, characterized in that the coating material contains fluorine.

6. Method according to claim 3, characterized in that the coating is carried out according to the PICVD-method.

7. Method according to claim1, characterized in that the material forming the core of the finished light wave guide is produced in an inner surface layer by treating the inner surface layer in such a way that a compound, being present in the surface layer is changed into a substance which diffuses out of the inner surface layer of the glass tube into the interior space of the glass tube at the temperature to be maintained during the diffusing-out process.

8. Method according to claim 3, characterized in that according to conventional coating methods one or several intermediate layers are applied before applying the layer containing the diffusing-out substance, whereby the intermediate layers are doped in an equal or different concentration with refractive index-changing substances, which yet do not diffuse out.

* * * * *